(12) United States Patent
Kotyk et al.

(10) Patent No.: US 11,044,843 B2
(45) Date of Patent: Jun. 29, 2021

(54) SEED ANALYSIS

(71) Applicant: Monsanto Technology LLC, St. Louis, MO (US)

(72) Inventors: Johnny J. Kotyk, Manchester, MO (US); Hsin-Chen Chen, Manchester, MO (US)

(73) Assignee: Monsanto Technology LLC, St. Louis, MO (US)

(*) Notice: Subject to any disclaimer, the term of this patent is extended or adjusted under 35 U.S.C. 154(b) by 107 days.

(21) Appl. No.: 16/271,005

(22) Filed: Feb. 8, 2019

(65) Prior Publication Data

US 2019/0307055 A1    Oct. 10, 2019

Related U.S. Application Data

(60) Provisional application No. 62/628,114, filed on Feb. 8, 2018.

(51) Int. Cl.

| | | |
|---|---|---|
| *A01C 1/04* | (2006.01) | |
| *B07C 5/342* | (2006.01) | |
| *A01C 1/02* | (2006.01) | |
| *G06K 9/00* | (2006.01) | |
| *G06N 20/00* | (2019.01) | |
| *G06K 9/66* | (2006.01) | |
| *G06T 7/00* | (2017.01) | |
| *G06K 9/62* | (2006.01) | |

(52) U.S. Cl.
CPC .............. *A01C 1/04* (2013.01); *A01C 1/02* (2013.01); *B07C 5/3425* (2013.01); *G06K 9/00147* (2013.01); *G06K 9/626* (2013.01); *G06K 9/66* (2013.01); *G06N 20/00* (2019.01); *G06T 7/0014* (2013.01); *B07C 2501/009* (2013.01); *G06T 2207/10116* (2013.01)

(58) Field of Classification Search
CPC ...... G06K 9/00147; G06K 9/66; G06K 9/626; G06N 20/00; G06T 7/0014
See application file for complete search history.

(56) References Cited

U.S. PATENT DOCUMENTS

| | | | |
|---|---|---|---|
| 2013/0229647 A1 | 9/2013 | Fredlund et al. | |
| 2015/0321353 A1* | 11/2015 | McCarty, II | G06T 7/12 700/259 |
| 2017/0295735 A1 | 10/2017 | Butruille et al. | |

OTHER PUBLICATIONS

S. K. Kamra, The X-ray Contrast Method for Testing Germinability of *Picea abies* (L.) Karst. seed, Studia Forestalia Suecica Nr. 90, 1971, retrieved electronically May 4, 2019, 28 pages, Skogshogskolan, Royal College of Forestry, Stockholm.
International Search Report and Written Opinion for Application No. PCT/US19/17171, dated Apr. 23, 2019, 9 pages, United States.

* cited by examiner

*Primary Examiner* — Ruiping Li
(74) *Attorney, Agent, or Firm* — Stinson LLP; Matthew Madsen

(57) ABSTRACT

A method of analyzing seeds including acquiring, using an X-ray machine, X-ray images of the seeds. Analyzing the X-ray images to determine a parameter of each of the seeds. Comparing a parameter determined from analyzing the X-ray image of one seed to a parameter determined from analyzing the X-ray image of another seed. Arranging the seeds relative to each other based on the seed parameters.

20 Claims, 12 Drawing Sheets

FIG. 10A
Intra Sample Comparison
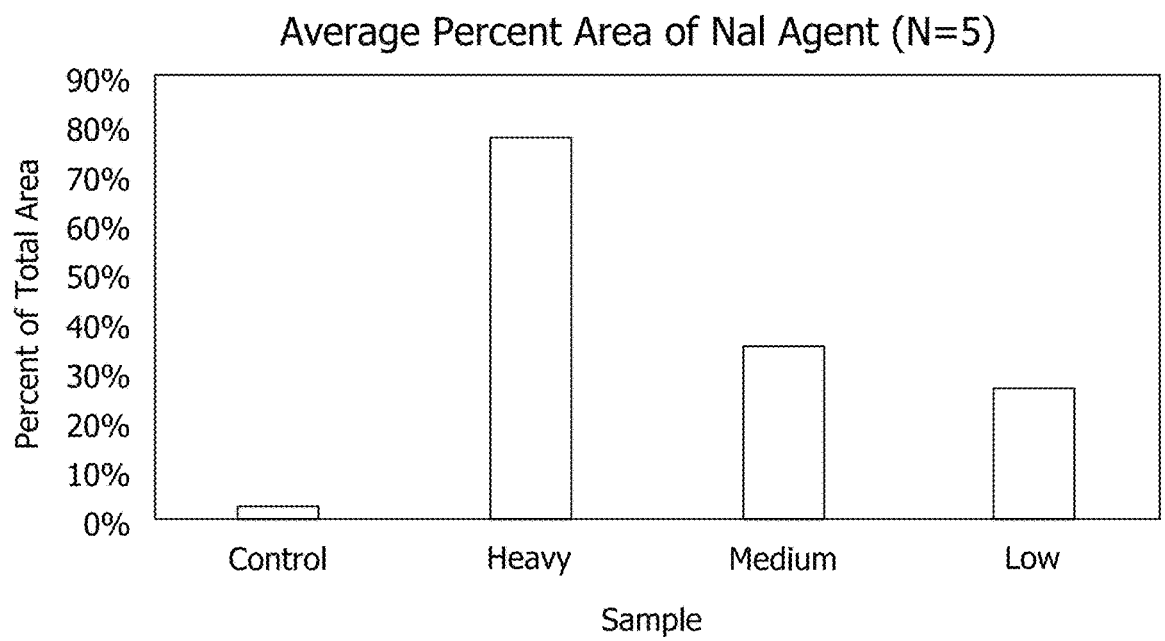
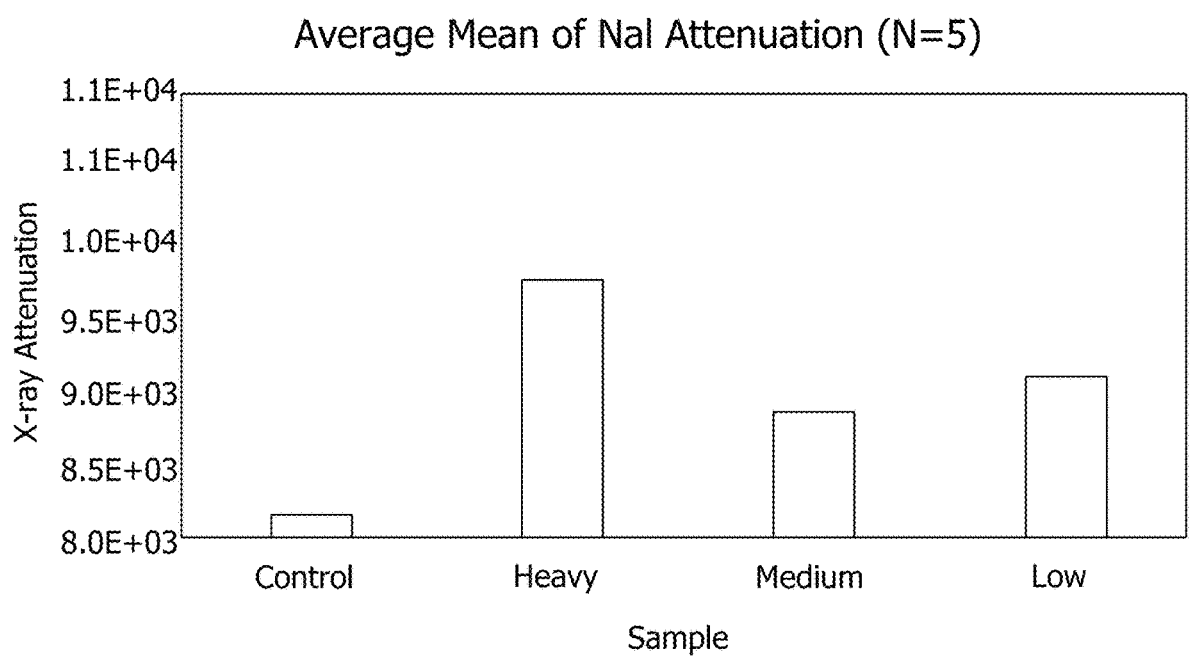

FIG. 10B
Inter Sample Comparison
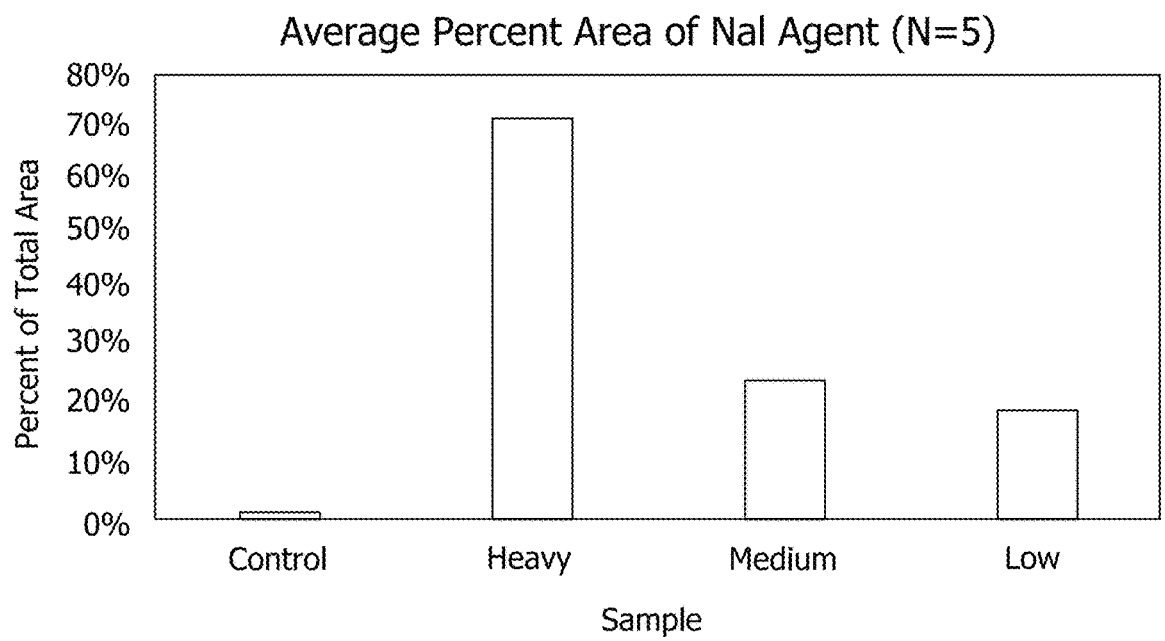
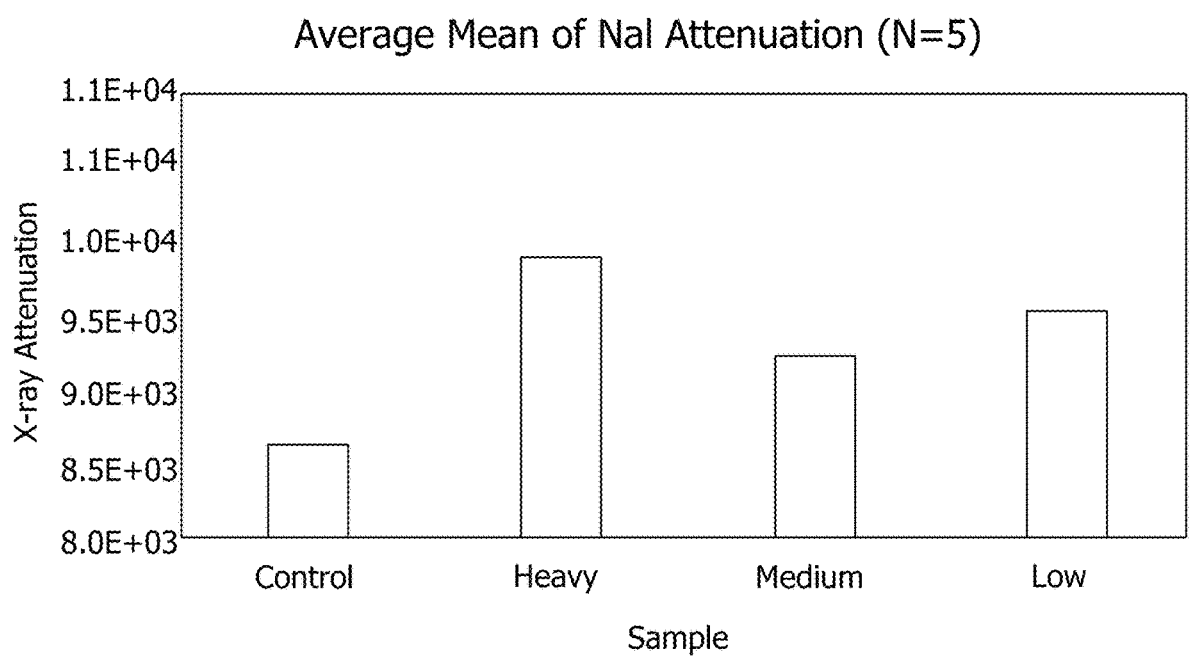

SEED ANALYSIS

CROSS-REFERENCE TO RELATED APPLICATION

This application is the nonprovisional application of U.S. Provisional Application Ser. No. 62/628,114 filed Feb. 8, 2018, the entirety of which is incorporated by reference.

FIELD

The present disclosure generally relates to a system and method for processing seeds, and more specifically, to a seed analysis system and method using X-ray imaging to analyze and categorize seeds.

BACKGROUND

In the agricultural industry, and more specifically in the seed breeding and production industry, it is important for scientists to be able to analyze seeds with high throughput. By this it is meant that the analysis of the seeds preferably occurs not only quickly, but also reliably and with high total volume. Historically, seeds are categorized by size using mechanical equipment containing screens with holes corresponding to predetermined sizes. Seed categorization is also conducted using image analysis of the seeds to detect certain appearance characteristics of the seeds. However, prior seed image analysis systems are limited in their ability to detect the size, shape, and appearance of the seeds. As a result, prior image analysis systems have limited capabilities for characterizing seed shape and defects. Additionally, prior image analysis systems do not enable automated collection of statistically significant data quantities for the development of robust data models for determining correlations between seed batches using seed quality metrics.

SUMMARY

In one aspect, a method of analyzing seeds generally comprises acquiring, using an X-ray machine, X-ray images of the seeds. Analyzing the X-ray images to determine a parameter of each of the seeds. Comparing a parameter determined from analyzing the X-ray image of one seed to a parameter determined from analyzing the X-ray image of another seed. Arranging the seeds relative to each other based on the seed parameters.

In another aspect, a method of analyzing seeds generally comprises acquiring, using an X-ray machine, X-ray images of the seeds. Analyzing the X-ray images to determine a parameter of each of the seeds. Categorizing each seed into one of at least two categories based on the parameters determined from analyzing the X-ray images of the seeds.

BRIEF DESCRIPTION OF THE DRAWING

FIGS. 10A and 10B are bar graphs illustrating the intra and inter sample variability of a group of cotton seeds.

Corresponding reference characters indicate corresponding parts throughout the drawings.

DETAILED DESCRIPTION

Figure 1:
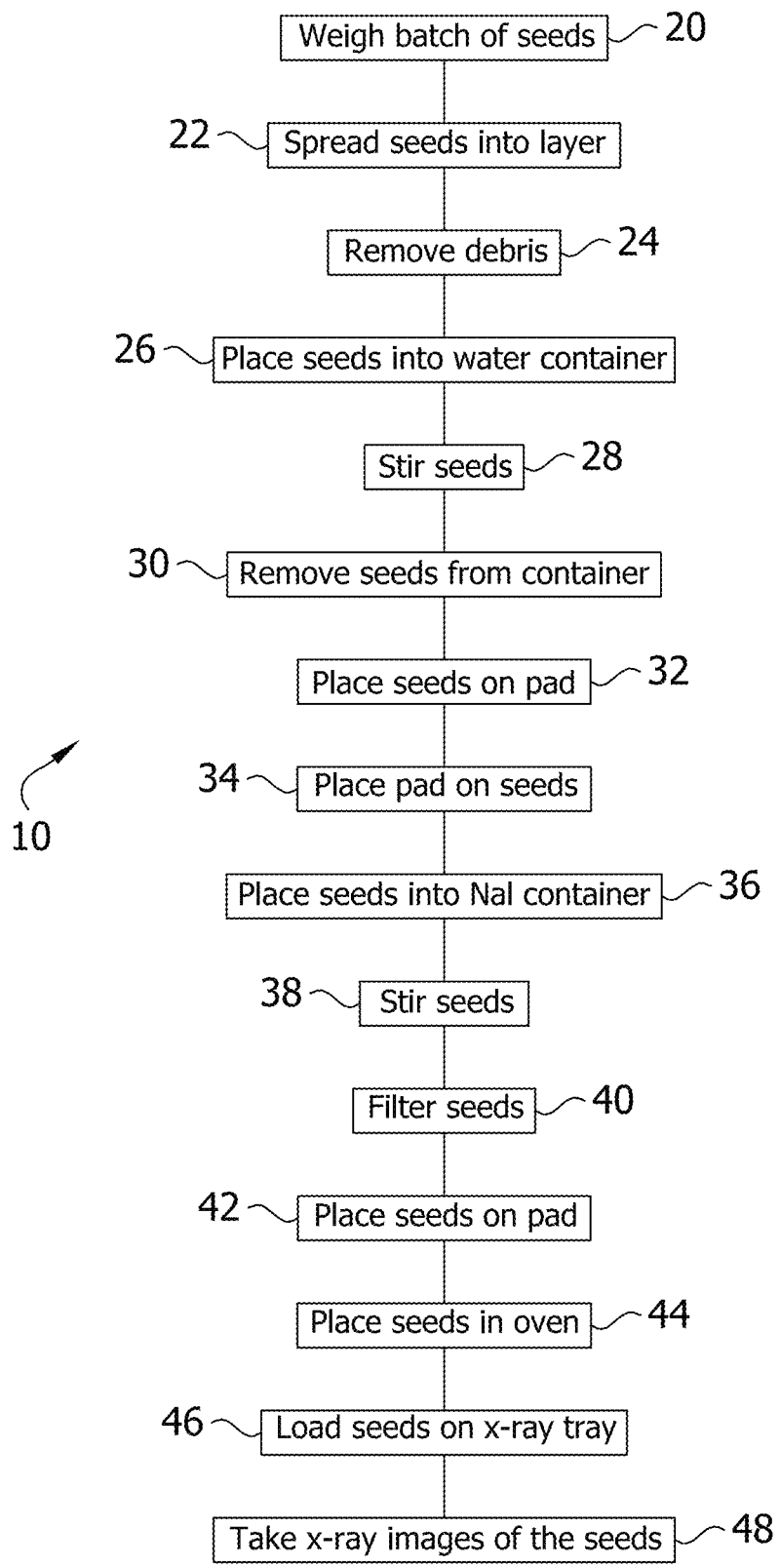
FIG. 1 is a block diagram of a seed analysis procedure.
Figure 2:
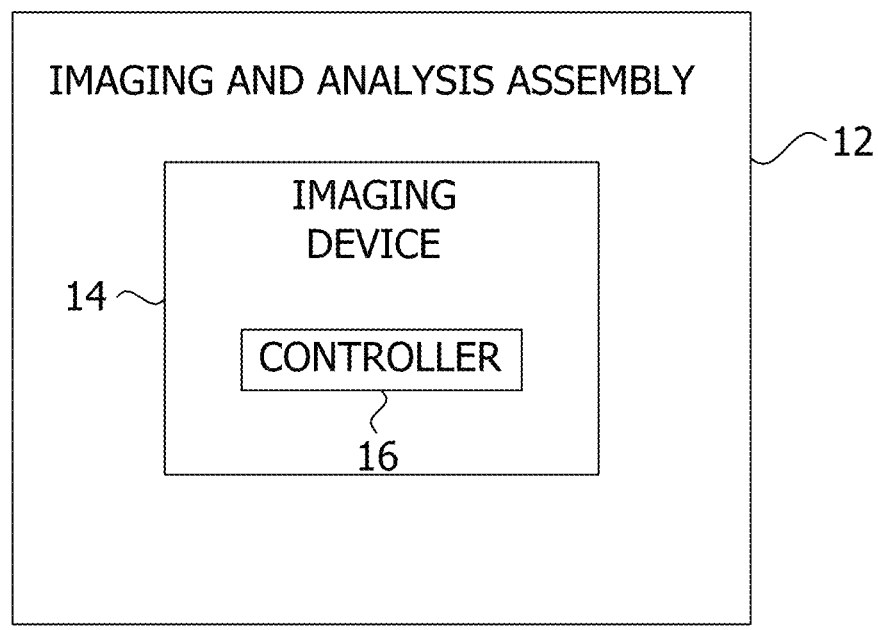
FIG. 2 is schematic illustration of a seed analysis system.
Figure 3:
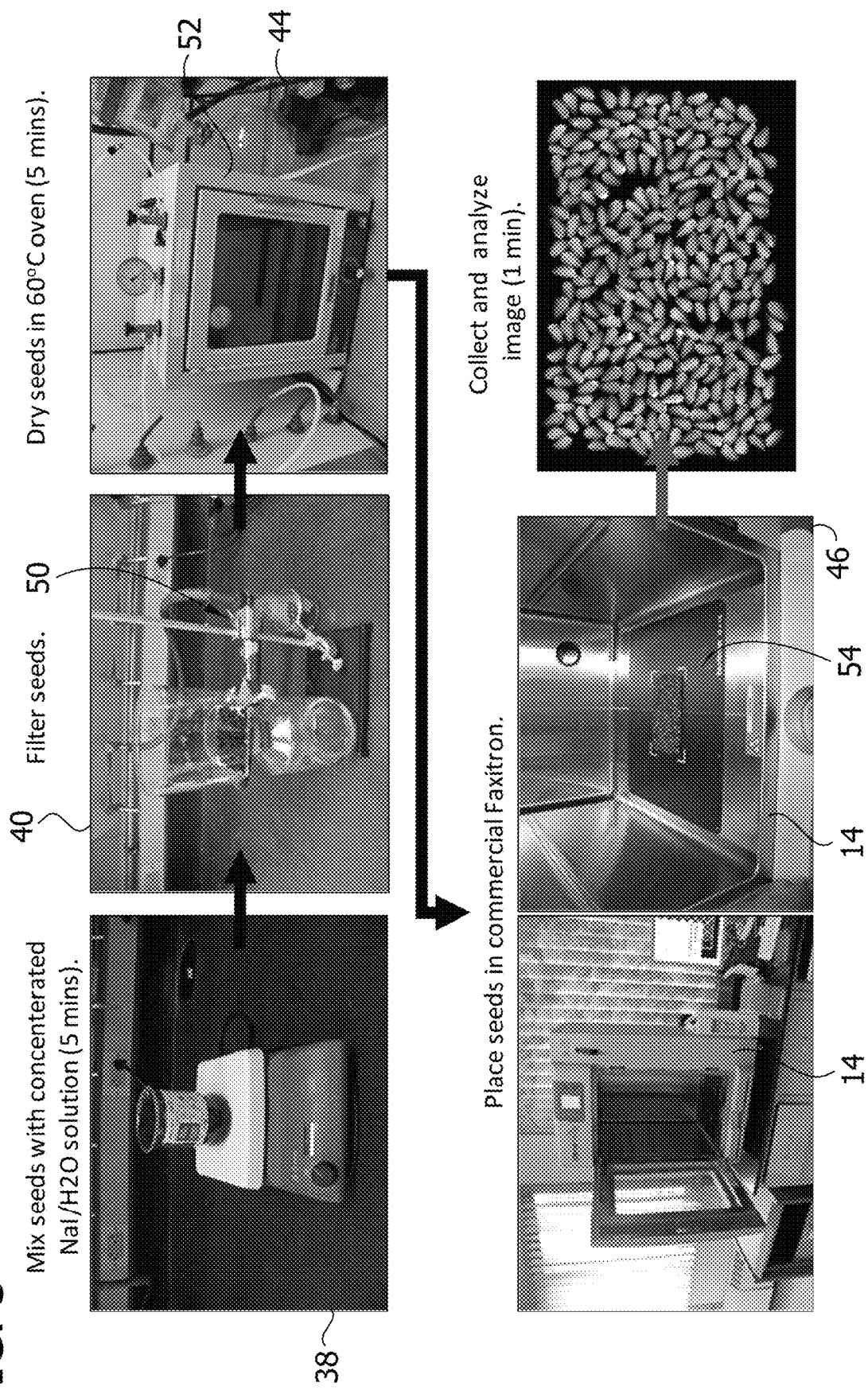
FIG. 3 is an illustration showing steps in the seed analysis procedure.

Referring to FIGS. 1-3, a seed analysis procedure is indicated generally at 10. The procedure cleans, treats, and images a plurality of seeds for indexing the seeds for later processing, assessment, or analysis. The procedure 10 comprises a plurality of steps for processing and treating seeds to accurately measure seed damage using an imaging and analysis assembly 12. In one embodiment, the imaging and analysis assembly 12 uses X-ray imaging. Thus, the present seed analysis procedure 10 adopts X-ray imaging treatment practices, similar to those used in the medical industry, for treatment and analysis of the seeds. The use of X-ray imaging allows for more sensitive seed damage detection to better detect variations and degrees of seed damage. The seed analysis procedure 10 can be used on a wide variety of seeds including, but not limited to, vegetable seeds (e.g., tomato) and row crop seeds (e.g., corn, soybean, canola, cotton).

Referring to FIGS. 2 and 3, the imaging and analysis assembly 12 comprises the imaging device 14 and a controller 16. In one embodiment the controller 16 is part of the imaging device 14. However, the controller 16 could be separate from the imaging device 14 and configured for communication with the imaging device. In the illustrated embodiment, the imaging device 14 is an X-ray machine for acquiring X-ray images of the seeds. In one embodiment, the X-ray machine 14 comprises a 2D X-ray imaging device. A suitable X-ray machine is manufactured by Faxitron®. However, other commercial or custom-built X-ray machines may be used without departing from the scope of the disclosure.

Referring to FIGS. 1 and 3, the seed analysis procedure 10 may be as follows. At 20 a batch of seeds are weighed. In one embodiment, a seed batch is selected such that the batch weighs between about 50 and about 60 grams. However, other batch weights are envisioned. At 22 the seeds are spread out on a surface into a single seed layer. At 24 debris and other particles (e.g., twigs, boll shells, etc.) are removed from the seeds. At 26 the seeds are placed in a container (e.g., a beaker) with de-ionized water. Depending on the amount of the seeds, they can be placed in a 1000 ml beaker filled with 500 ml of de-ionized water. At 28 the seeds are stirred in the container to rinse the seeds and remove dust/dirt from the seeds. In one embodiment, the seeds are stirred for about 1 minute. However, the seeds can be stirred for any suitable amount of time. At 30 the seeds are removed from the container and filtered using a funnel or screen. At 32 the seeds are placed on an absorbent pad and spread into a single layer to dry off the seeds. At 34 a second absorbent pad may be placed on top of the seeds to blot and/or roll dry the seeds. At 36 the seeds may be placed into a container filled with contrast agent (e.g., Sodium Iodide (NaI) or Ammonium Iodide ($NH_4I$)). However, other contrast agents may be used without departing from the scope of the disclosure. For example, any suitable chemical having iodide or barium, or any suitable medical imaging x-ray contrast agent may be used. In one embodiment, the seeds are placed into a 1000 ml beaker containing about 200 ml of 3 M NaI prepared using de-ionized water. At 38 the seeds are stirred to mix the seeds with the contrast agent. In one embodiment, the seeds are stirred for about 5 minutes using a magnetic stir bar. However, the seeds can be stirred by any suitable method. At 40 the seeds are filtered. In one embodiment, the seeds are filtered using a vacuum filter/storage bottle system 50. Although, filtering can be done using other methods. At 42 the filtered seeds are placed on a first, fresh absorbent pad, and a second, fresh absorbent pad is then placed over the seeds to blot and/or roll dry the seeds. At 44 the seeds are placed in an oven 52 to fully dry the seeds. In one embodiment, the seeds are placed in a drying oven set to about 60° C. (140° F.) for about 5 minutes. However, the seeds can be dried in other way. At 46 the seeds are spread into a single layer onto a tray 54 and placed in the X-ray machine 14 for obtaining X-ray images of the seeds at 48. It will be understood that the X-ray imaging process will be run according to the standard X-ray procedures provided for conventional X-ray machines.

Figure 4:
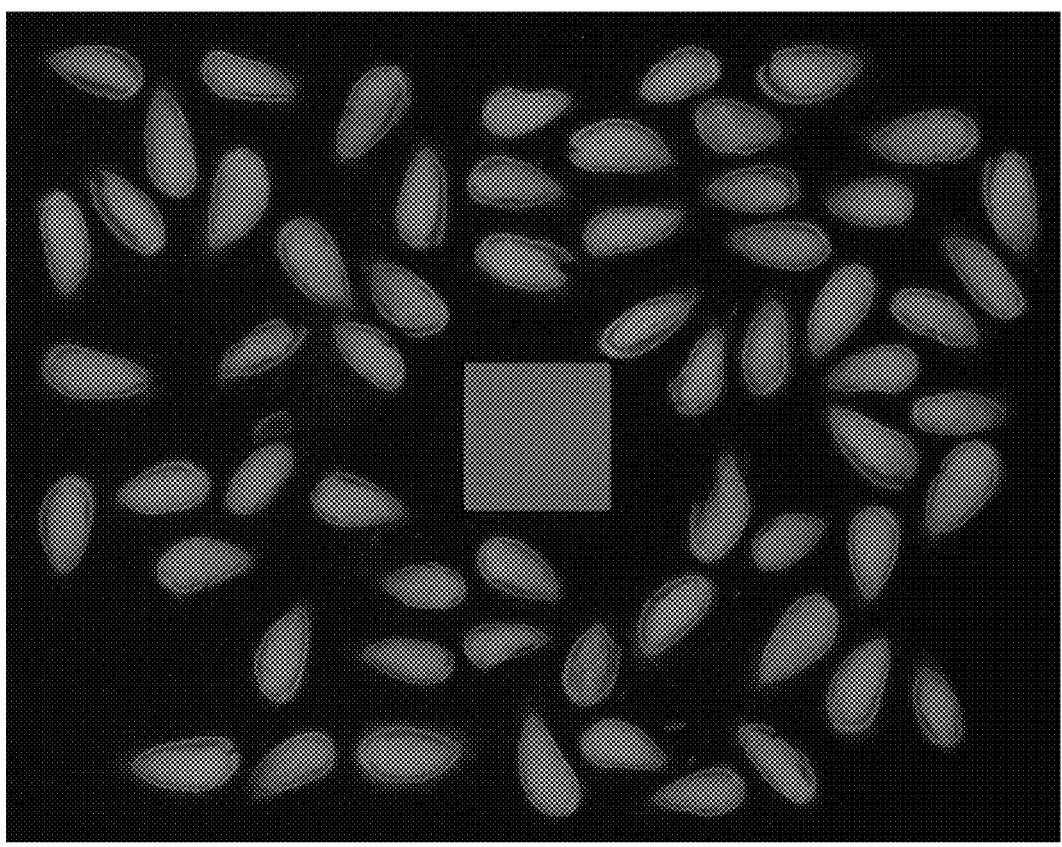
FIG. 4 is an X-ray image of a test sample of cotton seeds.
Figure 5A:
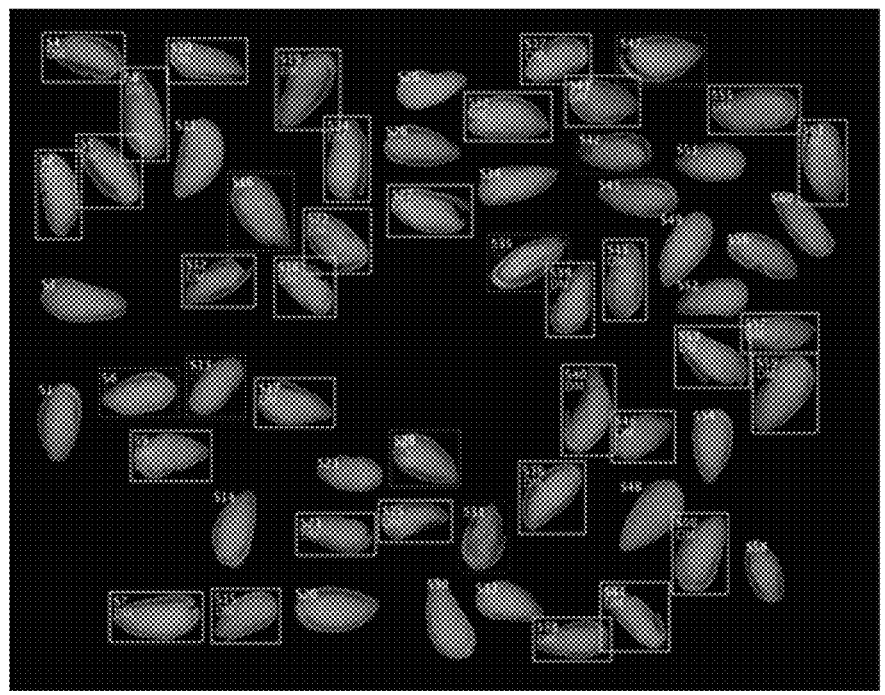
FIG. 5A is the X-ray image of FIG. 4 after a classification analysis has been performed on the X-ray image.
Figure 5B:
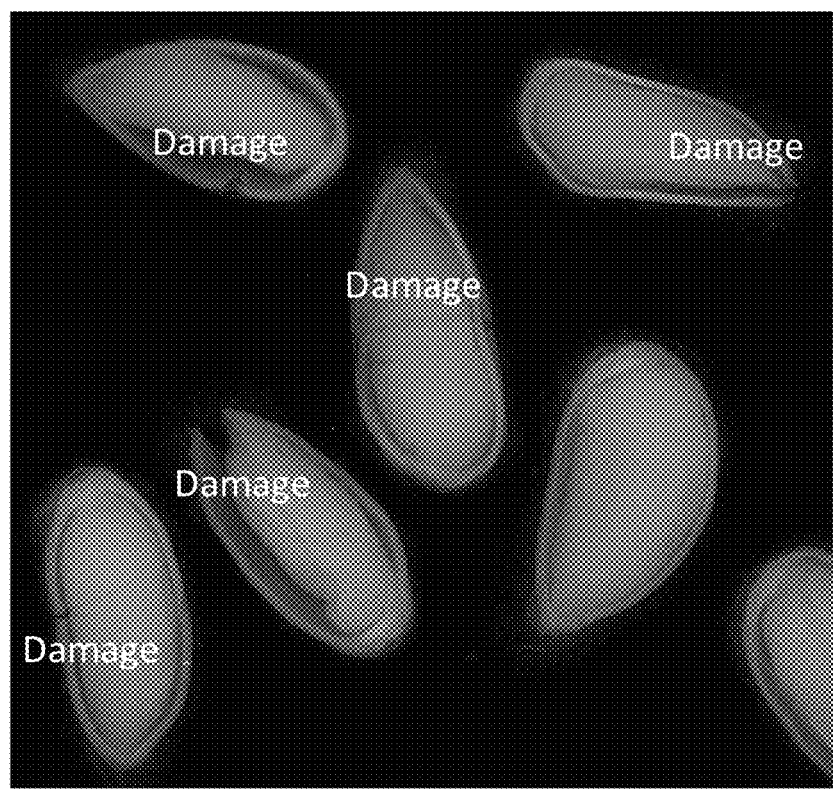
FIG. 5B is an enlarged fragmentary view of the X-ray image of FIG. 5A.

Additionally or alternatively, the seeds may be loaded onto a tray and imaged by the X-ray machine prior to or without the seeds being treated with the contrast agent. In this embodiment, damage to the seeds can be analyzed using a program on the controller 16 that uses automated machine learning/deep learning analytical approaches. In this process, a first (e.g., test sample) set of seeds is X-rayed to acquire a training set of data to identify the damaged seeds within the training set to assess seed damage for the test sample. This training process is used to establish classification rules which are then used to categorize subsequent seeds that are analyzed. The training process can be performed one or more times to increase the data input into the program to increase the accuracy of the classification analysis. As more and more data is input into the program the machine learning algorithms refine the classification rules to better classify and characterize the seeds. FIG. 4 shows an X-ray image of a test sample set of cotton seeds including both damaged and healthy seeds. FIGS. 5A and 5B are the X-ray image of FIG. 4 after the classification analysis has been performed in the training process. The damaged seeds are identified and the characteristics that qualify the seeds as damaged are learned by the system so that damaged seeds in a second set of seeds can be detected in subsequent analysis procedures using the machine learning program on the controller 16. Thus, the categorization procedure using the machine learning program on the controller 16 can be performed on any sample of seeds to categorize the seeds, including a sample of seeds taken from a seed production process.

Additionally or alternatively, the seeds can be imaged in a free fall or on a conveyor.

Additionally or alternatively, a manual or automatic sorting function can be performed after the seeds have been imaged and analyzed.

Based on the data acquired from the X-ray images obtained by the X-ray machine 14, each seed can be identified and categorized according to its appearance. For example, the degree of damage, evidenced by either comparison of the X-ray image of the seed to trained classifier data obtained from one or more prior training processes, or analysis of the amount of uptake of the contrast agent in the seed, can be determined by the program installed on the controller 16 or by a visual inspection of the X-ray images by a user. The program on the controller 16 may comprise a machine learning neural network that performs a series of classification routines to categorize the seeds based on their appearance. The appearance categories may be based on the trained classifiers for damage learned during prior training processes or on measurement threshold ranges identified for contrast agent uptake by the seeds. Based on these measures/ranges, each seed can be given a damage value, and/or the seeds can be ranked according to their level of damage. Additionally or alternatively, an inspection of the appearance of the X-ray images of seeds can be used to rank the seeds by their level of damage.

Figure 6:
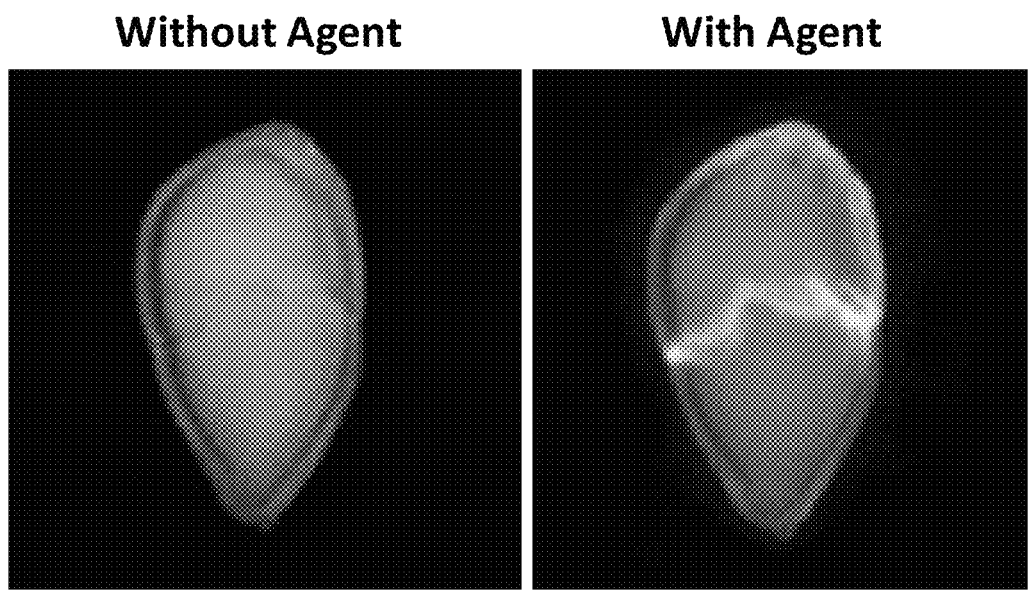
FIG. 6 are X-ray images of cotton seeds shown with and without treatment by a contrast agent.
Figure 7:
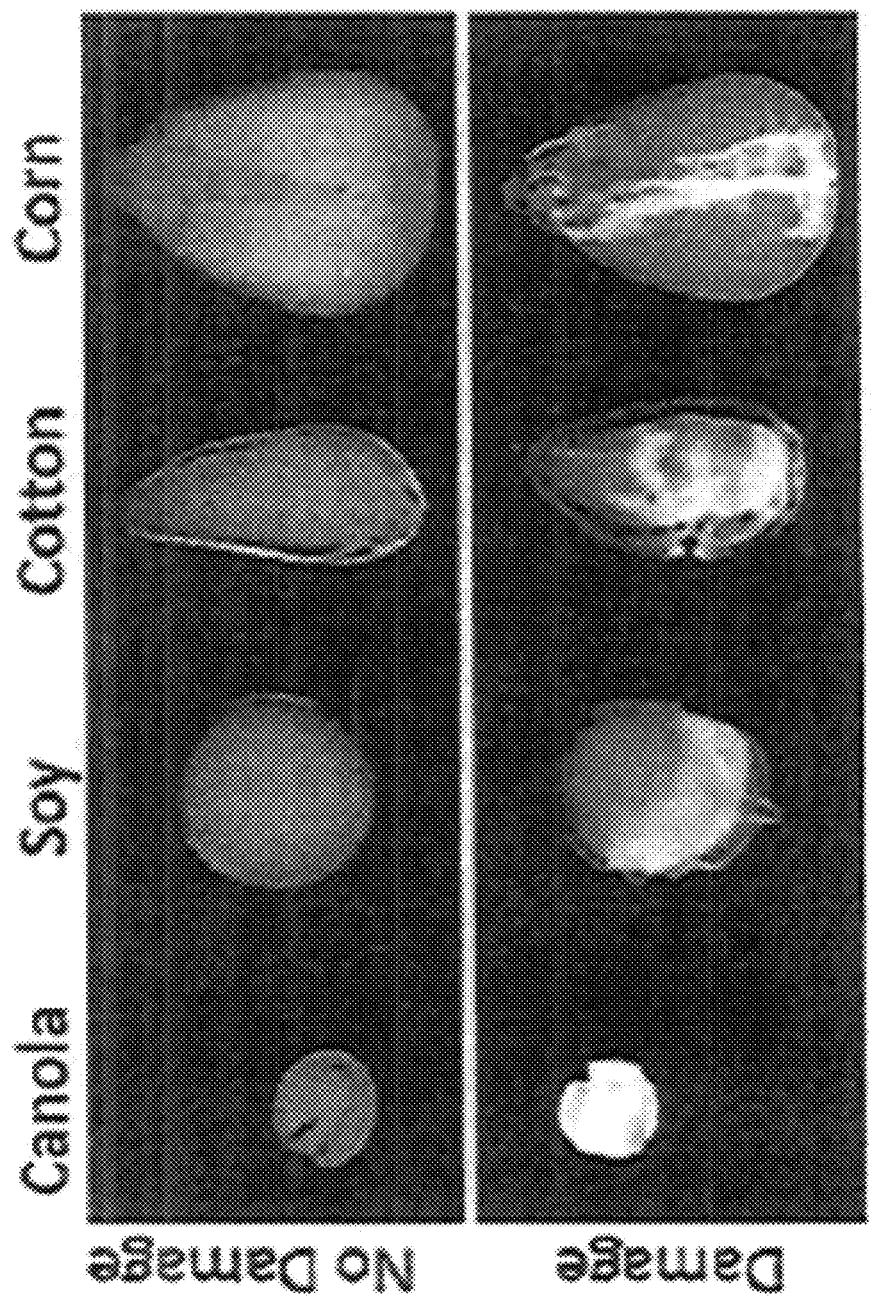
FIG. 7 are X-ray images of canola, soybean, cotton, and corn seeds with and without damage treated with a contrast agent.
Figure 8:
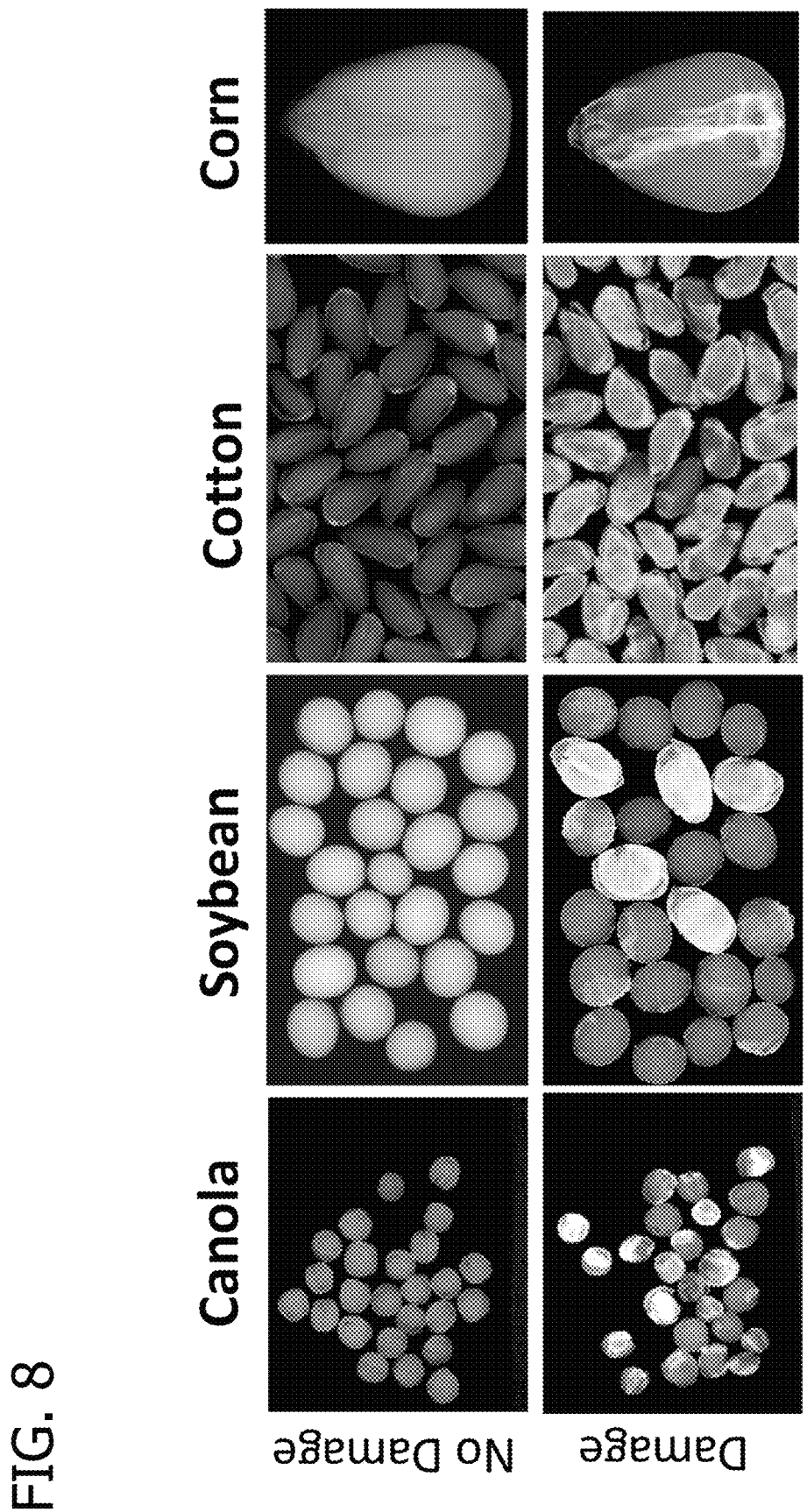
FIG. 8 are X-ray images of canola, soybean, cotton, and corn seeds with and without damage treated with a contrast agent.
Figure 9A:
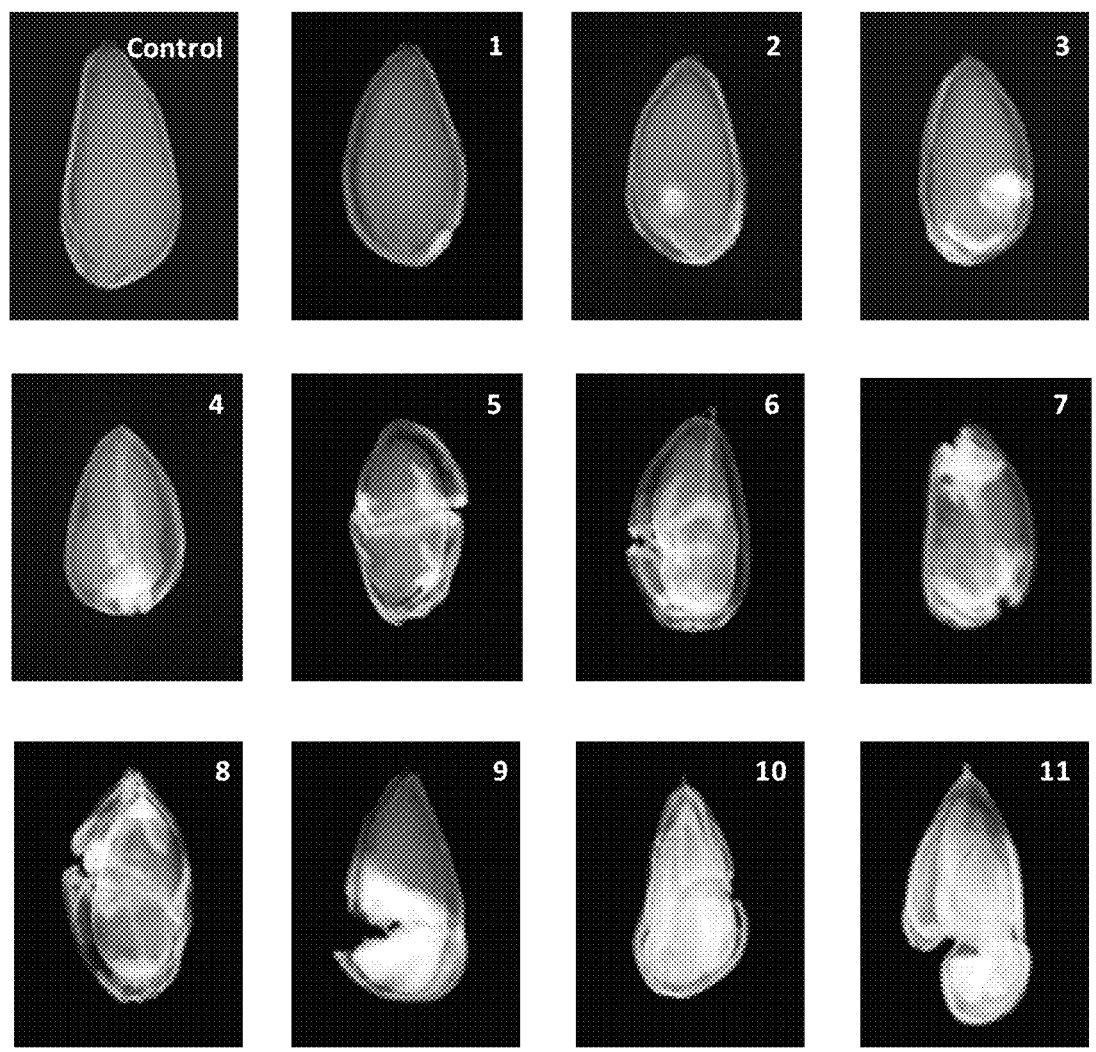
FIG. 9A are X-ray images of cotton seeds treated with a contrast agent and arranged according to a level of damage.
Figure 9B:
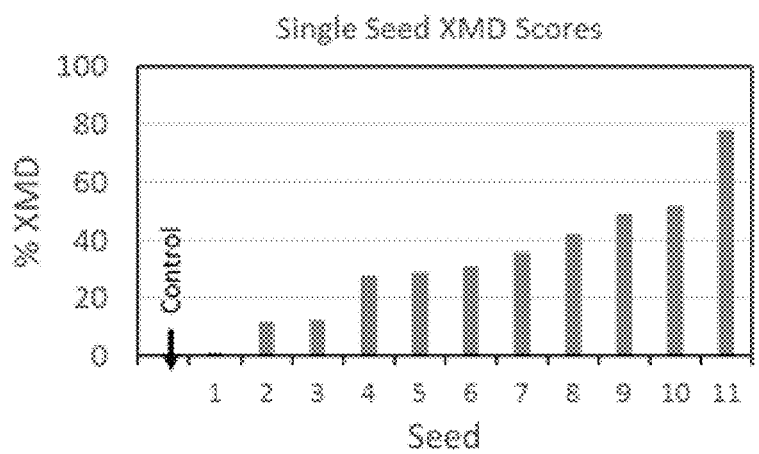
FIGS. 9B and 9C are graphs corresponding to the X-ray images in FIG. 9A.
Figure 9C:
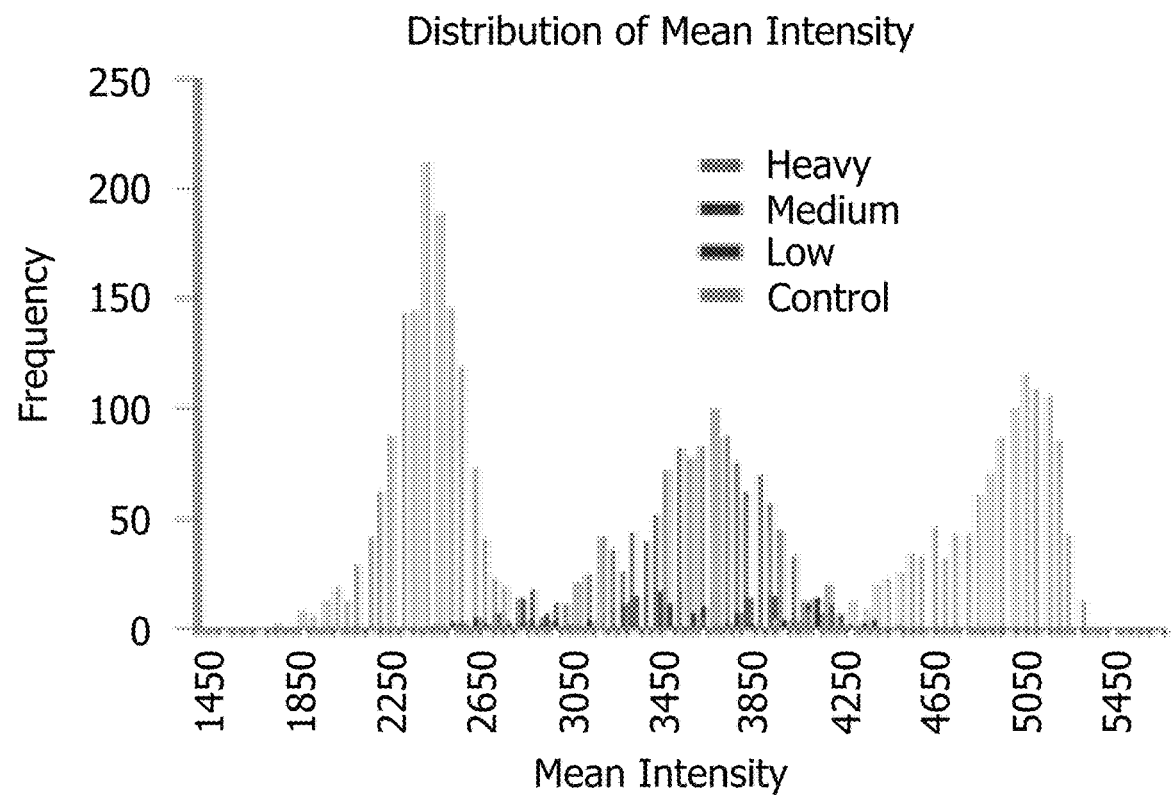

Referring to FIGS. 6-10, the X-ray images of healthy (good) seeds have a greater overall mean X-ray attenuation and a higher "filling factor" metric than defective (immature) seeds. The internal seed quality indicators assessed by X-ray imaging have proved to be a consistent and reliable detections method for distinguishing between healthy and defective seeds. And the results from X-ray imaging are consistent with those from a standard visual mechanical damage (VMD) protocol. As explained above, the seeds can be treated with a contrast agent to enhance the system's ability to detect subtle damage. FIG. 6 shows an X-ray image of a cotton seed with and without a contrast agent treatment. The seed that was treated with contrast agent better shows the external cracks in the seeds. Therefore, healthy seeds are more easily distinguished from damaged seeds because the healthy seeds are void of significant external cracks that can take up the contrast agent. Thus, the amount of uptake of contrast agent correlates to the amount of seed damage, and provides a more enhanced measure of damage than seeds that are not treated with contrast agent. FIGS. 7 and 8 show X-ray images of canola, soybean, cotton, and corn seeds with and without damage. The seeds are treated with a contrast agent to highlight any damage in the seeds. FIG. 9A shows X-ray images of cotton seeds treated with a contrast agent and arranged according to a level of damage. As can be seen in FIG. 9A, the darker images at the top represent healthier seeds with little to no damage and the brighter images at the bottom represent increasing levels of damage to the seeds. The brightness of the images is a reflection of the amount of contrast agent that has been taken up by the seeds. Thus, the healthy seeds will be dark as little or no contrast agent is taken up by the seeds, while the damaged seeds will be bright as a significant amount of contrast agent is taken up by the seeds. FIGS. 9B and 9C show graphs corresponding to the X-ray images in FIG. 9A. The graphs illustrate that the intensity of the X-ray images increases with the level of damage. The increase in intensity is attributable to the amount of contrast agent that is present in the seeds having high levels of damage. This intensity may be quantified by giving each seed a hyperintense X-ray absorption value which is represented in FIG. 9B. The graph of FIG. 9B shows the hyperintense X-ray absorption valve (XMD) as a percentage. The greater the percentage, the greater the uptake of contrast agent which corresponds to a greater degree of seed damage. FIG. 9C shows the distributions of the mean absorption obtained from the contrast-agent-treated seeds which demonstrate separation consistent with the damage determined from visual inspection and categorization of the seed damage, i.e., low, medium, high damage. FIGS. 10A and 10B show charts illustrating the intra and inter sample variability of a group of cotton seeds.

The information obtained using the seed analysis procedure 10 can be useful in the subsequent processing, assessment, or analysis of the seeds. For example, in seed production plants, the data generated in the deep learning analysis from the procedure 10 can be used to predict an overall distribution of defective seeds in a seed inventory, determine when in the production process creates defects in the seeds (e.g., harvesting, transporting, processing, or sorting), and then be used to correct or fix the step that creates the defect. Such measures can be used to determine the distribution of defective seeds of a sub sample of seeds which can then be extrapolated to predict the overall seed inventory status. The analyzed seeds can also be used in seed quality labs for assessing seed quality. Information from the procedure can be used in subsequent germination testing. Correlations between the degree and amount of cracks and the germination of the seed can be drawn.

In other embodiments, contrast agents may be added to liquid processing steps in seed production to enable removal of damaged seeds using a continuous-flow X-ray imaging and sorting system on a conveyor belt or free fall. For example, contrast agents may be added as an additional step following acid delinting and prior to seed drying in cotton seeds. In all crops, an additional contrast agent liquid treatment and rinse step prior to seed treatment may be considered to enable post-treatment X-ray imaging of seeds for sorting removal of damaged seeds from the product stream. Additionally or alternatively, seed treatments may be chosen for inherent X-ray contrast or a contrast agent may be added to the slurry to simplify the process of adding contrast agents in the production workflow.

To maintain accuracy and repeatability of the X-ray images, provisions for checking the proper functionality and calibration of the machine can be added to the process 10. For instance, time-stable reference samples can be designed to include X-ray transmission standards. These standards may include X-ray targets (e.g., a variable thickness sample machines from synthetic material). The standards can be imaged at periodic intervals (e.g., start of each batch) and imaging processing methods will be used to check the status of the imaging hardware and perform any necessary re-calibrations.

Having described the invention in detail, it will be apparent that modifications and variations are possible without departing from the scope of the invention defined in the appended claims.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained. As various changes could be made in the above constructions and methods without departing from the scope of the invention, it is intended that all matter contained in the above description and shown in the accompanying drawings shall be interpreted as illustrative and not in a limiting sense.

The invention claimed is:

1. A method of analyzing seeds, the method comprising:
   acquiring, using an X-ray machine, X-ray images of the seeds;
   analyzing the X-ray images to determine a parameter of each of the seeds;
   comparing a parameter determined from analyzing the X-ray image of one seed to a parameter determined from analyzing the X-ray image of another seed; and
   arranging the seeds relative to each other based on the seed parameters;
   wherein analyzing the X-ray images comprises determining, using a controller, a numerical X-ray absorption value of the seeds from the acquired X-ray images to quantify a degree of damage of the seeds, the X-ray absorption value being selectable from at least three different values.

2. The method of claim 1, wherein analyzing the X-ray images comprises analyzing the X-ray images using a machine learning program on a controller to determine the parameters of each of the seeds.

3. The method of claim 1, further comprising treating the seeds with a contrast agent.

4. The method of claim 1, wherein arranging the seeds comprises arranging, using the controller, each of the seeds based on the X-ray absorption value of the seeds.

5. The method of claim 3, wherein the X-ray images are acquired after the seeds are treated with the contrast agent.

6. The method of claim 5, further comprising acquiring, using the X-ray machine, X-ray images of the seeds prior to treating the seeds with the contrast agent.

7. The method of claim 1, further comprising weighing the seeds.

8. The method of claim 1, further comprising placing the seeds in a container of water to remove dirt and debris from the seeds.

9. The method of claim 3, further comprising filtering the seeds after the seeds are treated with the contrast agent.

10. The method of claim 9, further comprising placing the filtered seeds in an oven to dry the seeds.

11. The method of claim 3, wherein the seeds are treated with the contrast agent during a seed production process, the method further comprising using the determined parameters to remove damaged seeds from the seed production process.

12. The method of claim 1, wherein acquiring X-ray images of the seeds comprises acquiring the X-ray images with a continuous-flow X-ray imaging and sorting system, the method further comprising automatically sorting the seeds based on the determined parameter for each seed using the continuous-flow X-ray imaging and sorting system.

13. A method of analyzing seeds, the method comprising:
   acquiring, using an X-ray machine, X-ray images of the seeds;
   analyzing the X-ray images to determine a parameter of each of the seeds; and
   categorizing each seed into one of at least two categories based on the parameters determined from analyzing the X-ray images of the seeds;
   wherein analyzing the X-ray images comprises determining, using a controller, a numerical X-ray absorption value of the seeds from the acquired X-ray images to quantify a degree of damage of the seeds, the X-ray absorption value being selectable from at least three different values.

14. The method of claim 13, wherein analyzing the X-ray images comprises analyzing the X-ray images using a machine learning program on a controller to determine the parameters of each of the seeds.

15. The method of claim 14, wherein the steps of acquiring the X-ray images, analyzing the X-ray images, and categorizing each seed is done in a training routine to train the machine learning program to learn classification rules to determine the parameters of the seeds.

16. The method of claim 15, further comprising acquiring, using an X-ray machine, X-ray images of a different set of seeds, analyzing the X-ray images of the different set of seeds to determine a parameter of each of the seeds in the different set of seeds based on the classification rules learned in the training routine, and categorizing each seed in the different set of seeds into one of at least two categories based on the parameters determined from analyzing the X-ray images of the different set of seeds.

17. The method of claim 16, wherein the different set of seeds is obtained from a sample of seeds taken from a seed production process.

18. The method of claim 13, further comprising arranging, using the controller, each of the seeds relative to each other based on the X-ray absorption value of the seeds.

19. The method of claim 1, wherein the numerical X-ray absorption value is a percentage value on a scale from 0% to 100%.

20. The method of claim 11, wherein the seeds are treated with contrast agent after acid delinting and before seed drying.

* * * * *